(12) United States Patent
Broyles

(10) Patent No.: US 11,027,671 B1
(45) Date of Patent: Jun. 8, 2021

(54) DEVICE FOR HOLDING BLOWER EQUIPMENT IN TRUCK

(71) Applicant: Gregory Kelly Broyles, Fort Wayne, IN (US)

(72) Inventor: Gregory Kelly Broyles, Fort Wayne, IN (US)

( * ) Notice: Subject to any disclaimer, the term of this patent is extended or adjusted under 35 U.S.C. 154(b) by 0 days.

(21) Appl. No.: 16/985,482

(22) Filed: Aug. 5, 2020

(51) Int. Cl.
*B60R 11/06* (2006.01)
*E05B 73/00* (2006.01)
*B60R 11/00* (2006.01)

(52) U.S. Cl.
CPC ....... *B60R 11/06* (2013.01); *B60R 2011/0071* (2013.01); *B60R 2011/0096* (2013.01); *E05B 73/00* (2013.01)

(58) Field of Classification Search
CPC ............. B60R 11/06; B60R 2011/0093; B60R 2011/0071; E05B 73/00; A01G 20/47
USPC ................ 224/42.4, 564, 567, 569; 211/70.6
See application file for complete search history.

(56) References Cited

U.S. PATENT DOCUMENTS

| | | | |
|---|---|---|---|
| 3,893,568 A | 7/1975 | Like | |
| 4,473,176 A * | 9/1984 | Harper | B25H 3/006 |
| | | | 206/349 |
| 4,846,385 A * | 7/1989 | Fratus | B23Q 13/00 |
| | | | 224/569 |
| 4,930,694 A * | 6/1990 | Yoshitake | B60P 7/13 |
| | | | 224/547 |
| 5,647,489 A * | 7/1997 | Bellis, Jr. | A47B 81/005 |
| | | | 211/208 |
| 5,816,757 A | 10/1998 | Huston | |
| 5,964,358 A | 10/1999 | Hafendorfer | |
| 6,044,984 A * | 4/2000 | Crosby | B25H 3/04 |
| | | | 211/4 |
| 6,073,781 A * | 6/2000 | Puglisi | B25H 3/04 |
| | | | 211/60.1 |
| 6,086,298 A | 7/2000 | Fanuele | |

(Continued)

FOREIGN PATENT DOCUMENTS

AU   2013101564 A4   1/2014
CA      2285893      9/1999

OTHER PUBLICATIONS

Pro Parts Direct (The Lawn Care Professionals Choice for Part and Equipment Support Services: 800-305-9255 M-F 8am-5pm "Back Pack Blower Rack".

(Continued)

*Primary Examiner* — Justin M Larson
(74) *Attorney, Agent, or Firm* — Askew Intellecutal Property, LLC

(57) ABSTRACT

A baseplate with multiple mounting holes is configured to be mounted in a vehicle. Flange head posts or flange engaging ears are attached to the baseplate and are configured to engage a flange on the bottom plate of a blower. Engaging pins are also attached to the baseplate and are configured to engage with a recess or hole in the flange. A retaining bar with a lock engaging feature is pivotally attached to the baseplate and is configured to capture the flange between itself and the two engaging pins and/or to capture the flange between itself and the two flange head posts or flange engaging ears. A lock device is attached to the baseplate opposite the hinge or pivot. The lock engaging feature of the retaining bar and the lock device cooperate to secure the retaining bar in place over the flange on the bottom plate of the blower.

19 Claims, 15 Drawing Sheets

(56) References Cited

U.S. PATENT DOCUMENTS

| | | | |
|---|---|---|---|
| 6,302,280 B1 | 10/2001 | Bermes | |
| 6,409,029 B1 * | 6/2002 | Bermes | A01D 75/004 |
| | | | 211/207 |
| 6,536,610 B1 | 3/2003 | Taylor | |
| 6,619,485 B1 * | 9/2003 | Jenkins | E05B 73/00 |
| | | | 211/4 |
| 6,648,152 B2 * | 11/2003 | Bermes | B25H 3/006 |
| | | | 211/175 |
| 7,240,891 B2 | 7/2007 | Hafendorfer | |
| 7,762,408 B2 * | 7/2010 | Sargent | B60P 3/14 |
| | | | 211/85.7 |
| 7,762,510 B2 * | 7/2010 | Eller | B27B 17/0008 |
| | | | 248/309.1 |
| 7,849,557 B1 * | 12/2010 | Bellis, Jr. | B60P 3/14 |
| | | | 15/327.5 |
| 7,896,592 B1 | 3/2011 | Winchel | |
| 8,245,859 B2 | 8/2012 | Sargent | |
| 9,045,918 B2 * | 6/2015 | Sargent | E05B 73/00 |
| 10,202,786 B1 * | 2/2019 | Keegan | A01G 20/30 |
| 10,596,975 B1 | 3/2020 | Quintus | |
| 10,624,264 B1 * | 4/2020 | Seliga | A01D 42/06 |
| 10,669,084 B1 * | 6/2020 | Keegan | B65D 7/12 |
| 10,767,395 B2 * | 9/2020 | Keegan | A01G 18/60 |
| 10,914,100 B2 * | 2/2021 | Keegan | F16M 11/00 |
| 2003/0136158 A1 * | 7/2003 | Minasian | B60N 2/90 |
| | | | 70/14 |
| 2003/0226867 A1 * | 12/2003 | Knizner | B60R 9/06 |
| | | | 224/521 |
| 2005/0205750 A1 * | 9/2005 | Hafendorfer | A01G 20/47 |
| | | | 248/637 |
| 2014/0157744 A1 | 6/2014 | Anderson | |
| 2018/0328083 A1 * | 11/2018 | Sargent | E05B 73/00 |
| 2018/0340356 A1 * | 11/2018 | Brennan | E05B 73/00 |
| 2019/0048622 A1 * | 2/2019 | Keegan | F16M 11/00 |
| 2020/0023510 A1 * | 1/2020 | Sargent | B25H 3/006 |
| 2020/0191167 A1 * | 6/2020 | Stoddard | F04D 29/4226 |
| 2021/0078505 A1 * | 3/2021 | Reinhardt | A47B 46/00 |

OTHER PUBLICATIONS

Pro Parts Direct (the Lawn Care Professionals Choice for Part and Equipment Support Services: 800-305-9255 M-F 8am-5pm "Jungle Jim Dual Packpack Holder".

\* cited by examiner under the retaining bar. The user then rotates the retaining bar about its hinge or pivot at one end, and engages the feature on the retaining bar with the locking device such as a twist lock or padlock latch on the device at the other end. Preferably, the retaining bar engages with a flange on the rear of the base of the leaf blower, and the engaging pins engage with at least one recess or hole in the base of the leaf blower.

DEVICE FOR HOLDING BLOWER EQUIPMENT IN TRUCK

BACKGROUND

Field of Invention

Embodiments described herein generally relate to a Device for Holding Blower Equipment in a Truck. Embodiments of the Device for Holding Blower Equipment in a Truck provide secure theft-resistant mounting of leaf blowers when the leaf blowers are being transported or stored in a truck, trailer, or other vehicle.

Related Art

Landscaping and lawn care businesses use various kinds of powered equipment in performing their work, including but not limited to lawn mowers, trimmers, edgers, and leaf blowers. In order to provide services to customers, landscaping and lawn care businesses must therefore transport their powered equipment to customer locations. In order to do so, these businesses typically use transport vehicles such as trucks and trailers. During transport, and when it is onsite but not in use, the powered equipment, which is expensive and valuable, is often targeted for theft. Therefore, various known solutions have been implemented for securing powered equipment to the transport vehicles, both at the job site and in transit.

One known solution involves grasping the equipment around a shaft, as shown in U.S. Pat. No. 8,245,859 (Sargent). In this arrangement, removal of powered equipment such as trimmers is prevented by way of the powerhead and/or working end of the device being too large to fit through the locking block in its locked position. Other known solutions involve merely placing a cable, chain, and/or suitable padlock through an opening in the structure or frame of a piece of powered equipment, and locking the cable, chain, and/or padlock to a structure of the transport vehicle.

Leaf blowers present a particular challenge in preventing theft. They are cumbersome overall, so that any device for holding a blower must accommodate the blower air pipe and must support them by way of the blower's baseplate, backplate, or harness. Often, they provide little or no suitable structure for grasping, shackling, or passage of a chain or cable, so that known solutions such as that shown in Sargent will not work. Furthermore, known devices for securing leaf blowers typically do not provide for quick and easy removal and/or reattachment of the leaf blower from the securing device by authorized personnel. Landscaping and lawn care businesses rely on the productivity of their employees, so that such a slow and tedious process of removal and/or reattachment of leaf blowers from known securing devices interferes with that productivity. Additionally, if the process of removing and/or reattaching leaf blowers from known securing devices is sufficiently inconvenient, employees will simply fail to utilize the securing devices, leading to further theft.

For example, U.S. Pat. No. 6,302,280 (Bermes) shows a securing device that grasps the backplate of the leaf blower. In order to remove the leaf blower from the Bermes device and begin to use it, a user must first release the leaf blower from the hooks of the securing device, and then must turn the leaf blower around in order to place it on the user's back. This presents an additional inconvenience in that clearance must be provided for the blower tube as the leaf blower is turned around. Similarly, U.S. Pat. No. 6,536,610 (Taylor) shows a securing device that secures the leaf blower by means of vertical tubular members on the leaf blower that fit over spaced rods on the securing device. As a result, when the leaf blower is to be removed from the securing device of Taylor, the leaf blower must be lifted vertically a substantial distance to disengage it from the securing device. In the same way, when the leaf blower is to be attached to the securing device of Taylor, it must again be lifted vertically a substantial distance while the tubular members are aligned with the spaced rods. This again provides a sufficient inconvenience that employees of landscaping and lawn care businesses may not take the time and effort to use the securing device.

Contributing to the challenge of providing a suitable device to prevent theft is the fact that leaf blowers are generally manufactured to various specifications, even within the product line of a given manufacturer. Among other specifications, leaf blower models are often provided in a spectrum of available horsepower. For example, at the time of this writing, Stihl Incorporated of 536 Viking Dr, Virginia Beach, Va. 23452, manufactures gasoline powered backpack style leaf blowers in eleven different models ranging from 1 horsepower weighing about 12½ pounds to about 4½ horsepower weighing 23 pounds. Furthermore, landscaping and lawn care businesses sometimes use sprayer tanks and attachments that mount to the top of the of leaf blowers, so that the leaf blowers may be used for both blowing and/or spraying. As a result, known devices for securing leaf blowers, which sometimes encompass the entire leaf blower, often are incapable of accommodating the variability of these leaf blowers.

Accordingly, there is an unmet need for a Device for Holding Blower Equipment in a Truck that is suitable for securely holding leaf blowers while providing for quick and easy attachment and removal of the leaf blower.

SUMMARY

Embodiments described herein relate to a Device for Holding Blower Equipment in a Truck which is configured to be bolted in place in a truck bed or on a trailer. For this purpose, the device is provided with an approximately 12 inch by 12 inch base plate having multiple bolt patterns. The Device for Holding Blower Equipment in a Truck further has a retaining device in the form of a retaining bar that engages a flange on the rear of the base of the leaf blower. At least one engine-side engaging device in the form of at least one engaging pin on the device beneath the retaining bar engages with at least one recess or hole in the base of the leaf blower. Preferably, two engaging pins on the device beneath the retaining bar engage with the at least one recess or hole in the base of the blower. The retaining bar has a hinge or pivot at one end and a feature that engages a locking device such as a twist lock or padlock latch on the device at the other end. At least one harness-side flange engaging device in the form of at least one post with a flanged head or at least one flange engaging ear engages with a flange on the front corners of the base of the leaf blower. Preferably, two posts with flanged heads or flange engaging ears engage with the flange on the front corners of the base of the leaf blower.

In this way, once the flange on the front corners of the base of the leaf blower is slid under the harness-side flange engaging devices in the form of posts with flanged heads or flange engaging ears, the at least one recess or hole in the base of the leaf blower is lowered over the engine-side flange recess or hole engaging device in the form of at least one engaging pin, and the retaining device in the form of a retaining bar is secured over the flange on the rear of the base of the leaf blower, the leaf blower is securely locked in place by its baseplate. As a result, the Device for Holding Blower Equipment in a Truck performs its securing function simply and quickly without interfering with any accessories, such as sprayer tanks, mounted to the upper part of the leaf blower. Furthermore, the Device for Holding Blower Equipment in a Truck is able to accommodate leaf blowers of varying horsepower that are generally manufactured by a given manufacturer using a common baseplate and backplate.

The several embodiments of the Device for Holding Blower Equipment in a Truck described herein are described for use with leaf blowers, but this is not to be construed as limiting the scope of the Device for Holding Blower Equipment in a Truck in any way, which may include embodiments that may be used for entirely different purposes, such as dedicated backpack mounted sprayers, backpack mounted pressure washers, and backpack mounted vacuums, for non-limiting example. Additional embodiments of the Device for Holding Blower Equipment in a Truck may be provided with a sliding and/or pivoting structure connected to the base plate, thereby further enhancing the convenience of loading and unloading the leaf blower from the device. This sliding and/or pivoting device may have a gas spring cylinder or other spring mechanism in an over-the-center arrangement to hold the base plate of the Device for Holding Blower Equipment in a Truck in an extended or retracted position as required.

Further embodiments of the Device for Holding Blower Equipment in a Truck may be provided with a hook or other device for securing the blower tube while in transit. Still further embodiments of the Device for Holding Blower Equipment in a Truck may feature a baseplate with extended width and having two or more sets of harness-side flange engaging devices in the form of posts with flanged heads or flange engaging ears, and two or more sets of engine-side flange recess or hole engaging devices in the form of engaging pins, and two or more retaining devices in the form of retaining bars (or a single extended retaining bar). In this way, two or more leaf blowers may be mounted to such an embodiment of the Device for Holding Blower Equipment in a Truck.

According to one embodiment of the invention, a Device for Holding Blower Equipment in a Truck includes a baseplate with at least one mounting feature. At least one blower harness-side flange engaging device is attached to the baseplate. At least one engine-side flange recess or hole engaging device is also attached to the baseplate. An engine-side retaining device is also connected to the baseplate.

According to another embodiment of the invention, a Device for Holding Blower Equipment in a Truck includes a 12 inch by 12 inch baseplate with multiple mounting holes that is configured to be mounted in a vehicle. Two blower harness-side flange head posts or harness-side flange engaging ears are attached to the baseplate and are configured to engage a flange on the harness-side of the bottom plate of a blower. Two engine-side flange recess or hole engaging pins are also attached to the baseplate and are configured to engage with at least one recess or hole in the flange of the bottom plate of the blower. A retaining bar is pivotally attached at one end to the baseplate by way of a hinge or pivot, and has a lock engaging feature at the other end. The retaining bar is configured to engage the flange on the engine-side of the bottom plate of the blower and to capture the flange between the retaining bar and the two engine-side flange recess or hole engaging pins and/or capture the flange between the retaining bar and the two blower harness-side flange head posts or harness-side flange engaging ears. A lock device is attached to the baseplate opposite the hinge or pivot. The lock engaging feature of the retaining bar and the lock device is configured to secure the retaining bar in place over the flange on the engine-side of the bottom plate of the blower.

According to yet another embodiment of the invention, a method of holding blower equipment includes several steps. The first step is mounting a baseplate in a vehicle using at least one mounting feature. The second step is attaching at least one blower harness-side flange engaging device to the baseplate and configuring the at least one blower harness-side flange engaging device to engage a flange on the harness-side of a bottom plate of a blower. The third step is attaching at least one engine-side flange recess or hole engaging device to the baseplate and configuring the at least one engine-side flange recess or hole engaging device to engage with at least one recess or hole in the flange of the bottom plate of the blower. The fourth step is pivotally attaching an engine-side retaining device at one end to the baseplate and providing a lock engaging feature at the other end of the engine-side retaining device. The fifth step is configuring the engine-side retaining device to engage the flange on the engine-side of the bottom plate of the blower and to capture the flange between the retaining bar and the two engine-side flange recess or hole engaging pins and/or capture the flange between the retaining bar and the two blower harness-side flange head posts or harness-side flange engaging ears. The sixth step is attaching a lock device to the baseplate opposite the hinge or pivot, and configuring the lock device to secure the retaining bar by way of its lock engaging feature in place over the flange on the engine-side of the bottom plate of the blower.

Embodiments of the Device for Holding Blower Equipment in a Truck securely hold leaf blowers while providing for quick and easy attachment and removal thereof. Embodiments of the Device for Holding Blower Equipment in a Truck further accommodate leaf blowers of various sizes that are manufactured with common baseplates and backplates.

DESCRIPTION OF THE DRAWINGS

The above-mentioned and other features of embodiments of the Device for Holding Blower Equipment in a Truck, and the manner of their working, will become more apparent and will be better understood by reference to the following description of embodiments of the Device for Holding Blower Equipment in a Truck taken in conjunction with the accompanying drawings, wherein.

Corresponding reference numbers indicate corresponding parts throughout the several views. The exemplifications set out herein illustrate embodiments of the Device for Holding Blower Equipment in a Truck, and such exemplifications are not to be construed as limiting the scope of the claims in any manner.

DETAILED DESCRIPTION

Figure 1:
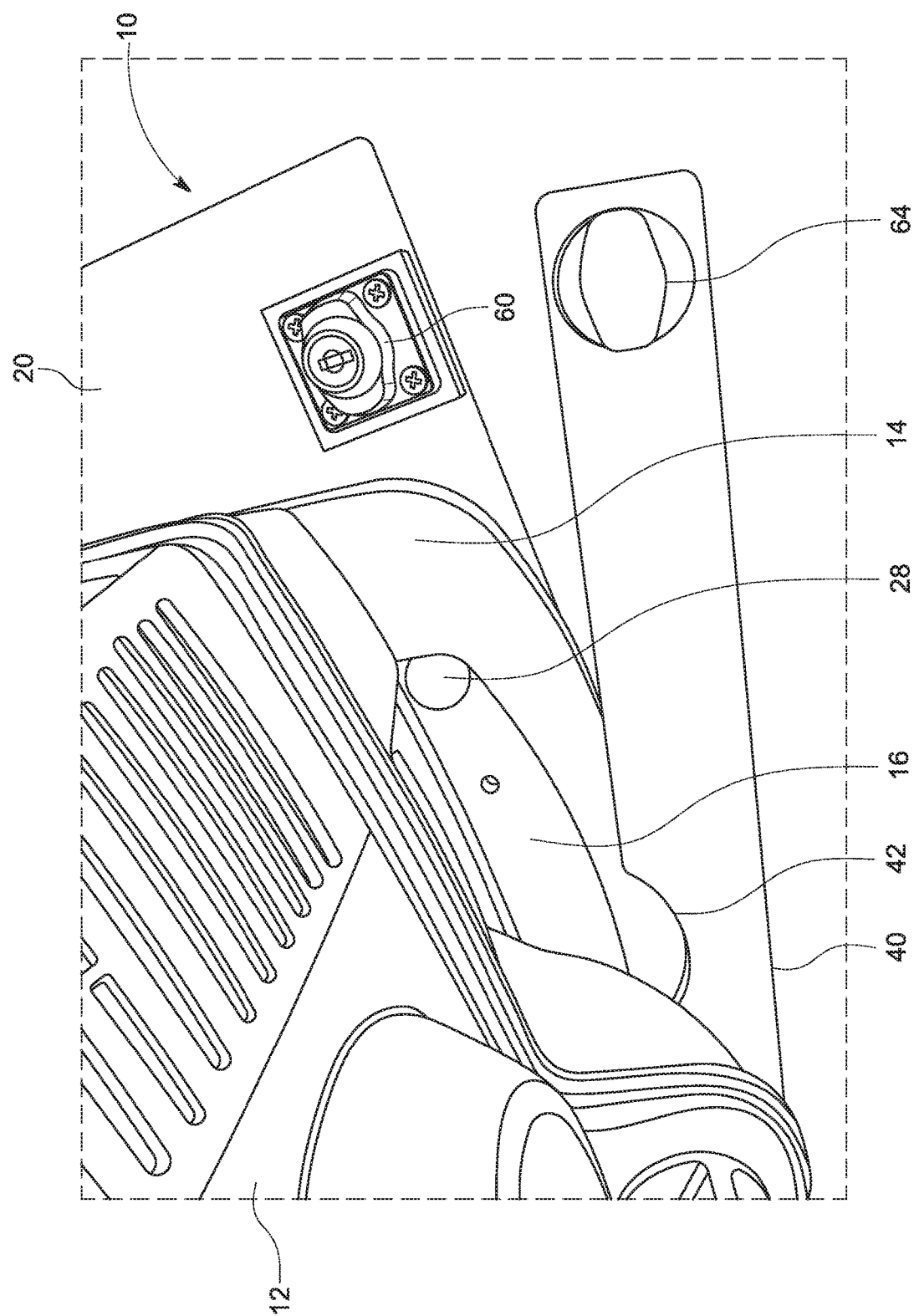
FIGS. 1-3 are top left front perspective views of an embodiment of a Device for Holding Blower Equipment in a Truck showing a blower being retained thereto, as described herein.
Figure 2:
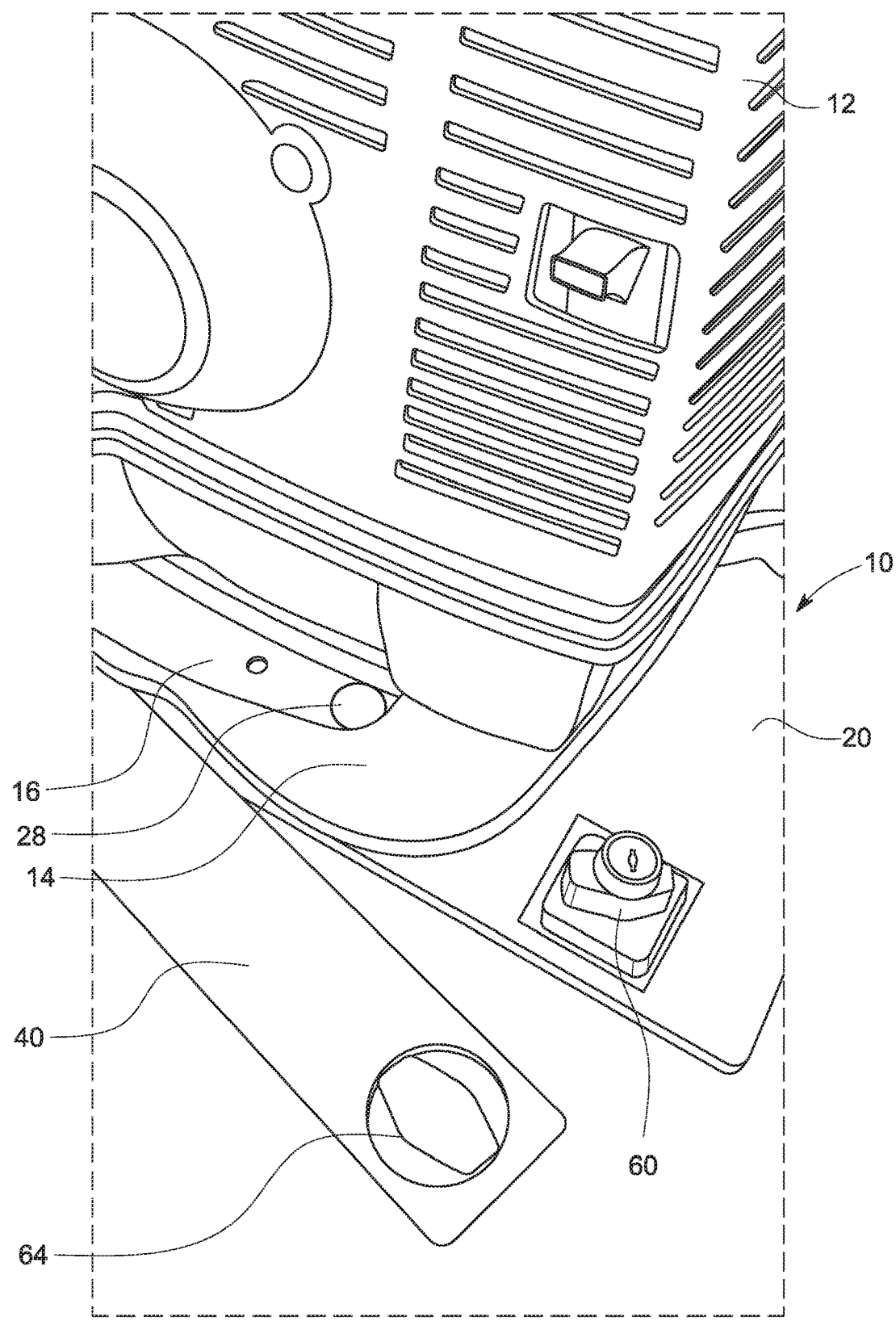
Figure 3:
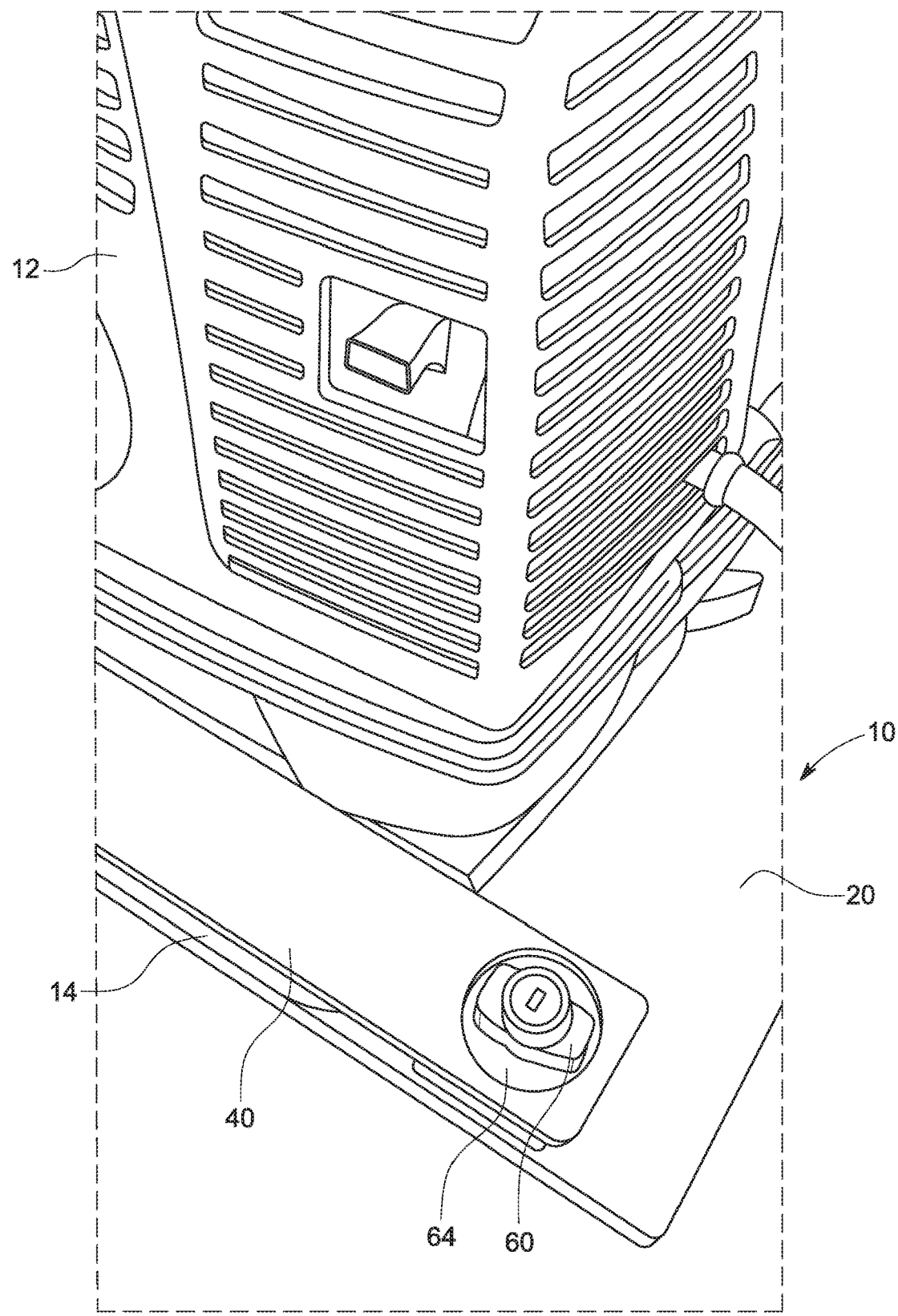
Figure 4:
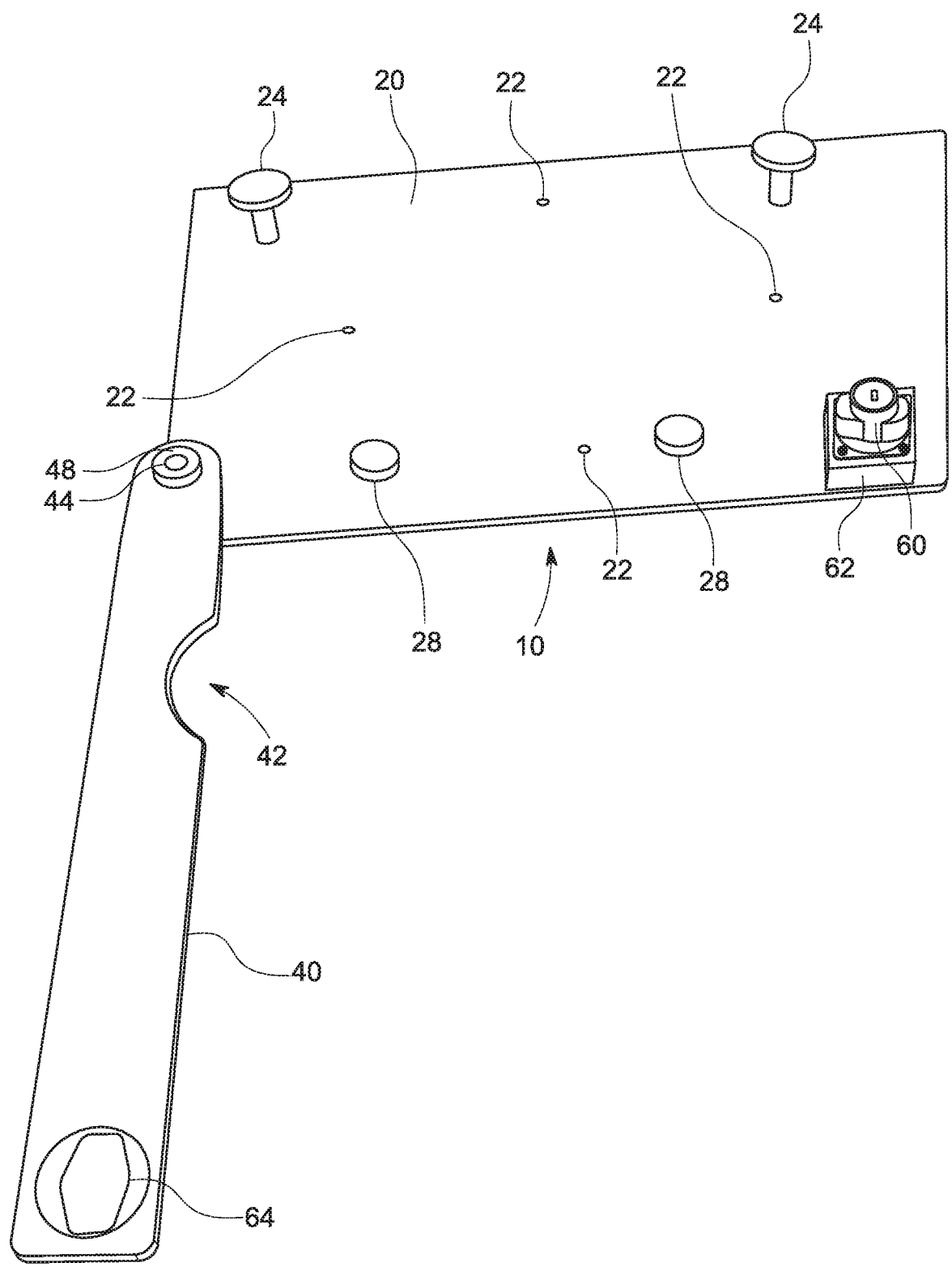
FIG. 4 is a top front perspective view of the embodiment of a Device for Holding Blower Equipment in a Truck shown in FIGS. 1-3, having the retaining bar in an open position, as described herein.
Figure 5:
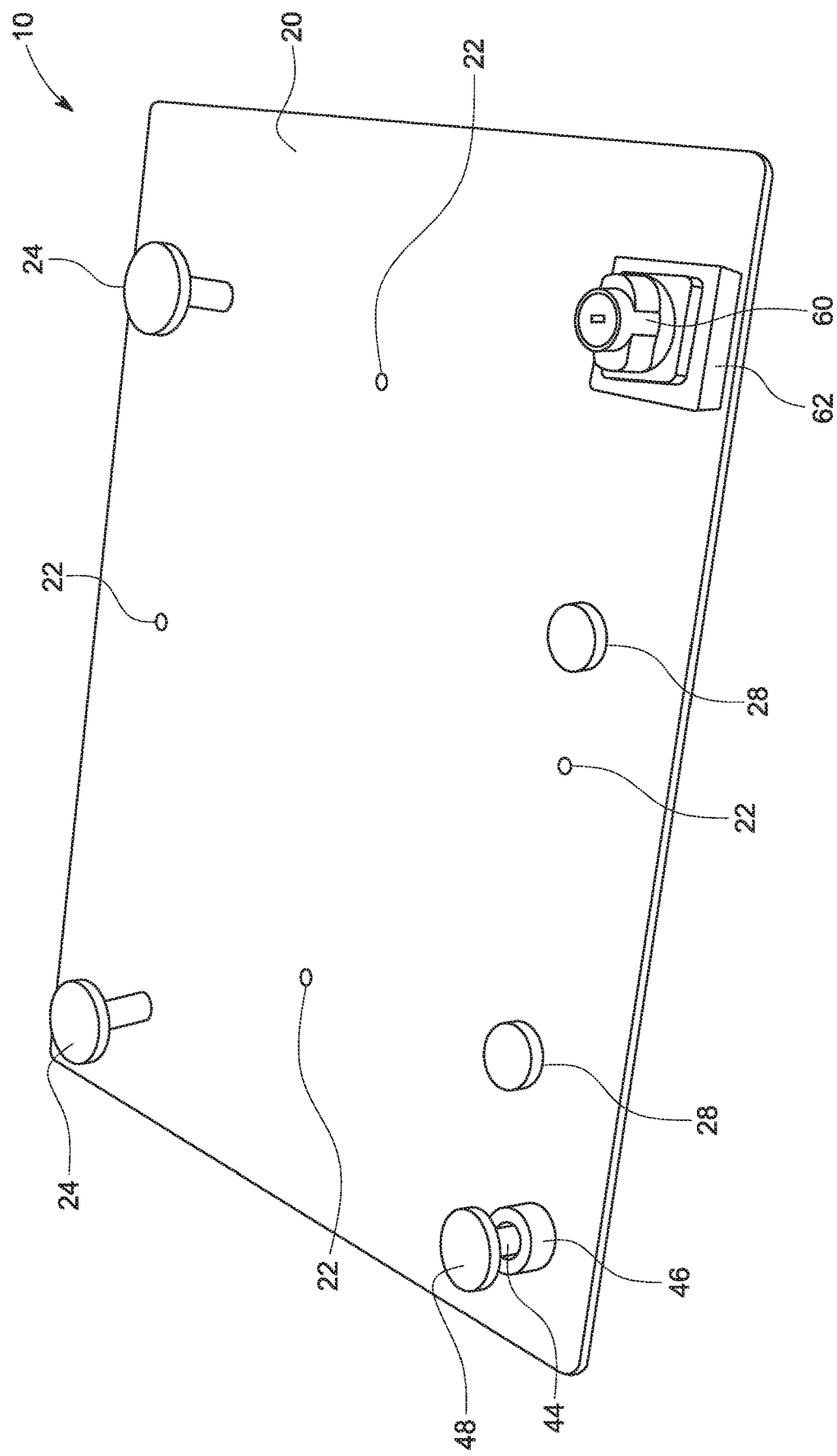
FIG. 5 is a top left front perspective of the embodiment of a Device for Holding Blower Equipment in a Truck shown in FIGS. 1-4, with the retaining bar removed, as described herein.
Figure 6:
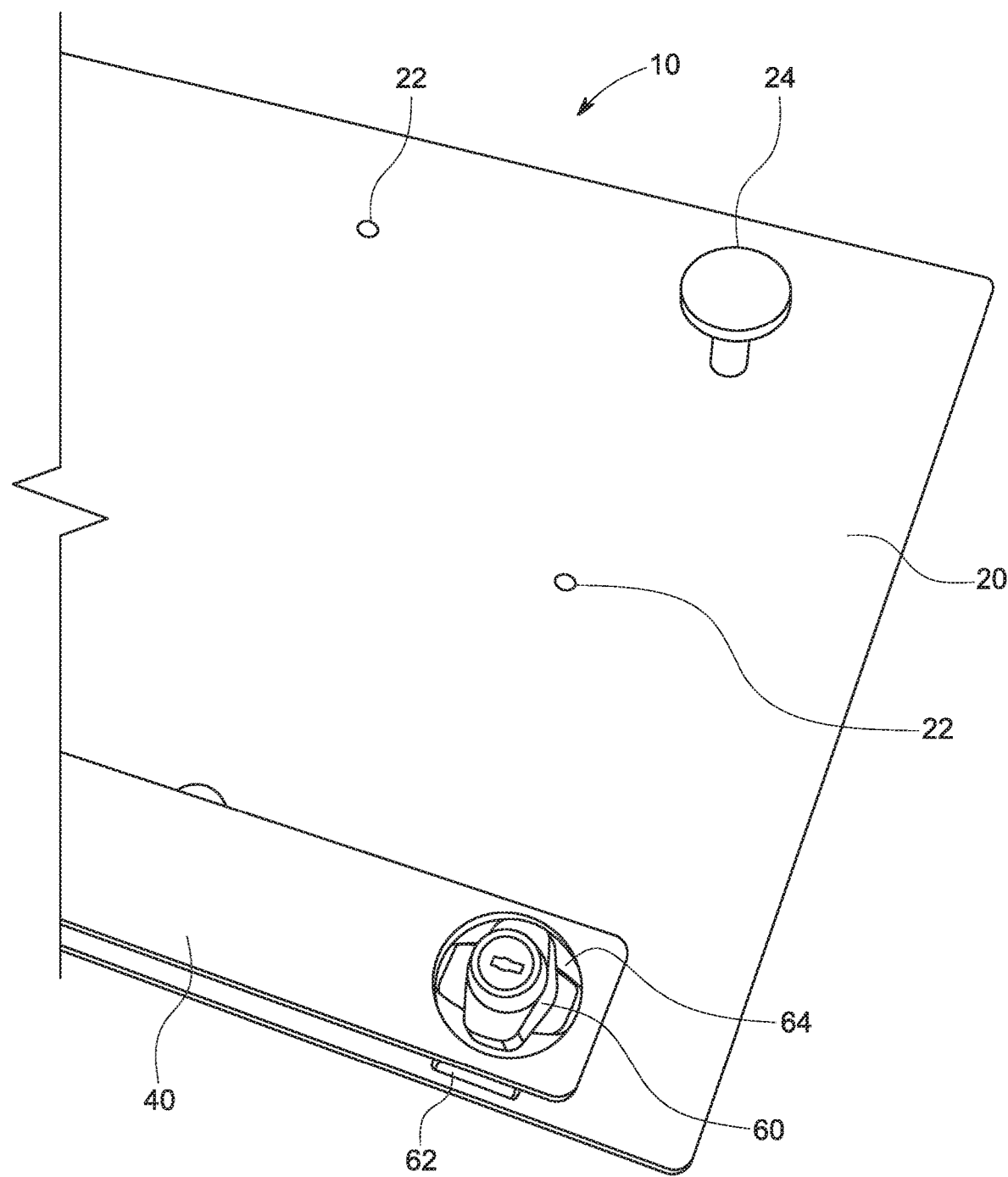
FIG. 6 is a partial top left front perspective view of the embodiment of a Device for Holding Blower Equipment in a Truck shown in FIGS. 1-5, showing detail of the rotating lock, retaining bar rotating lock engaging feature, and flange head posts, as described herein.
Figure 7:
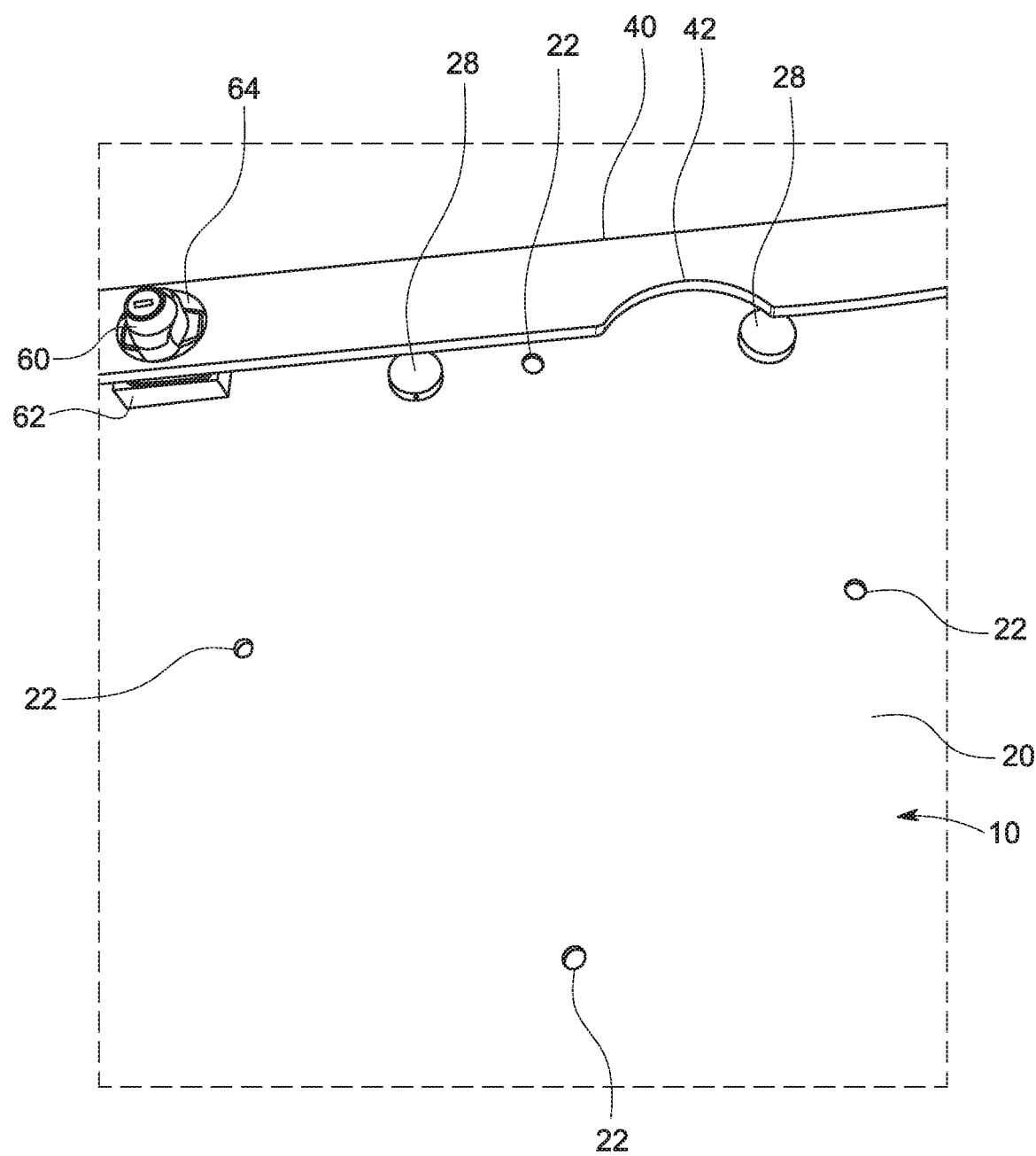
FIG. 7 is a partial top rear perspective view of the embodiment of a Device for Holding Blower Equipment in a Truck shown in FIGS. 1-6, showing detail of the rotating lock, retaining bar rotating lock engaging feature, and flange recess or hole engaging pins, as described herein.
Figure 8:
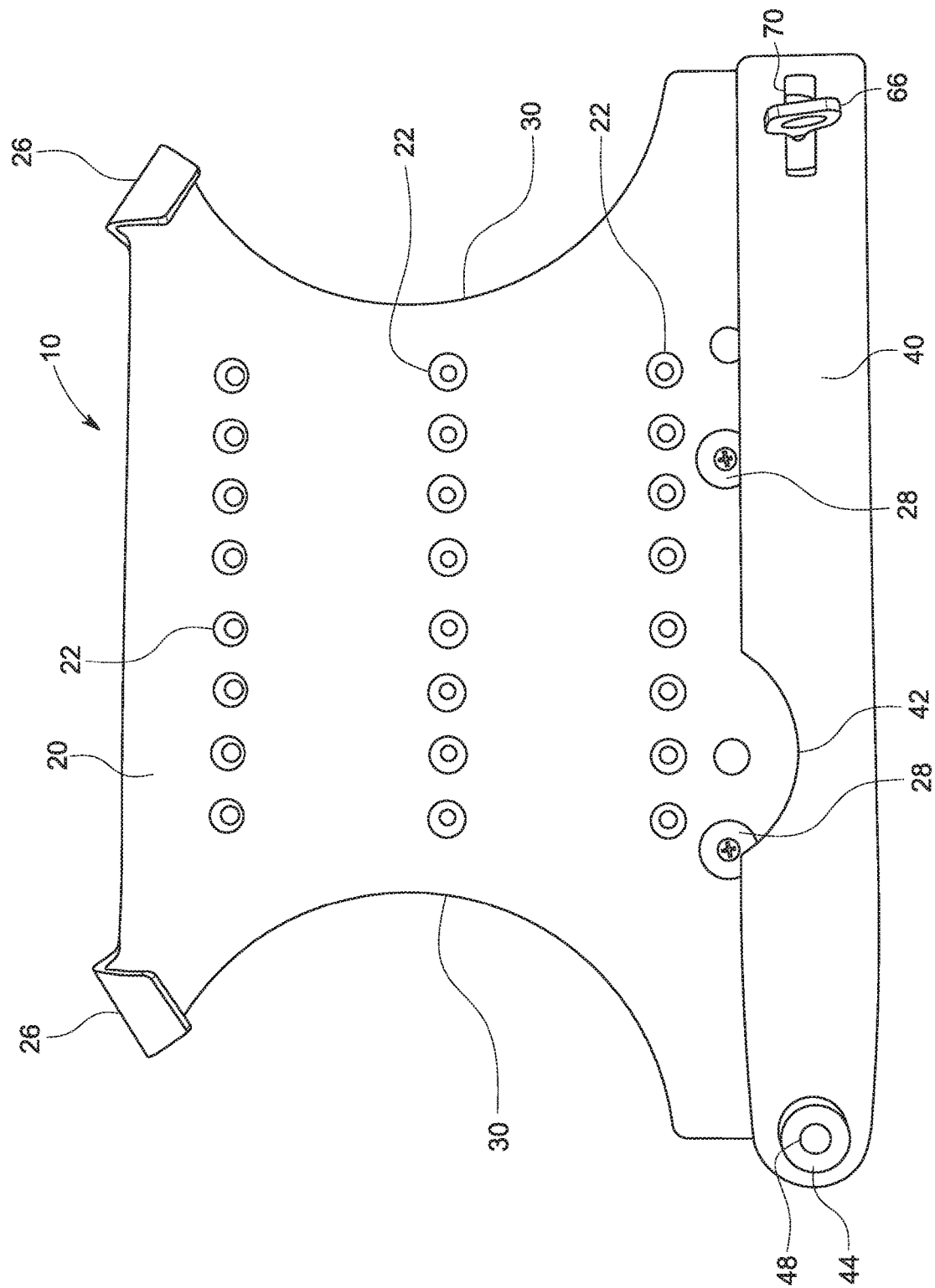
FIG. 8 is a top view of another embodiment of a Device for Holding Blower Equipment in a Truck, as described herein.
Figure 9:
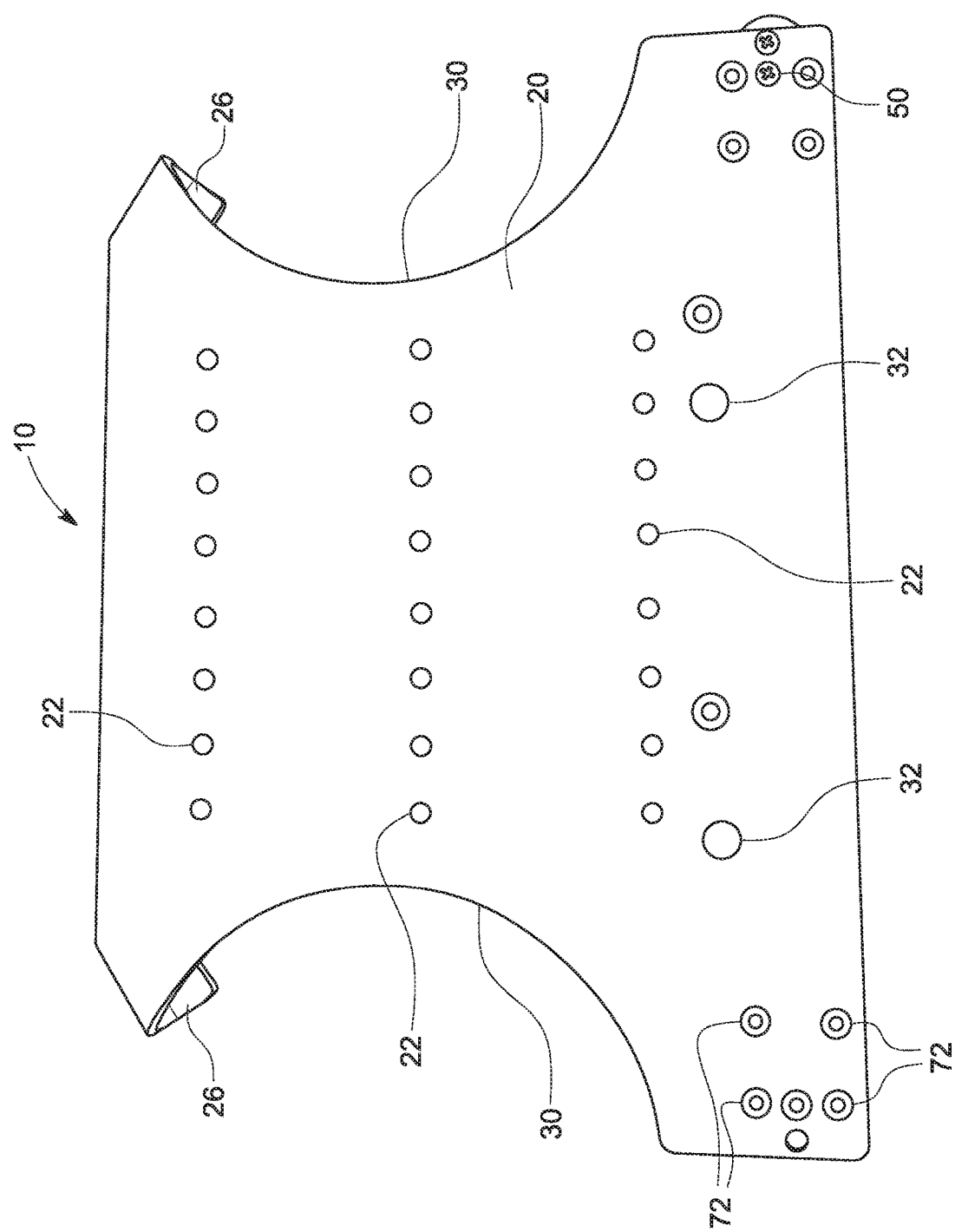
FIG. 9 is a bottom view of the embodiment of a Device for Holding Blower Equipment in a Truck shown in FIG. 8, as described herein.
Figure 10:
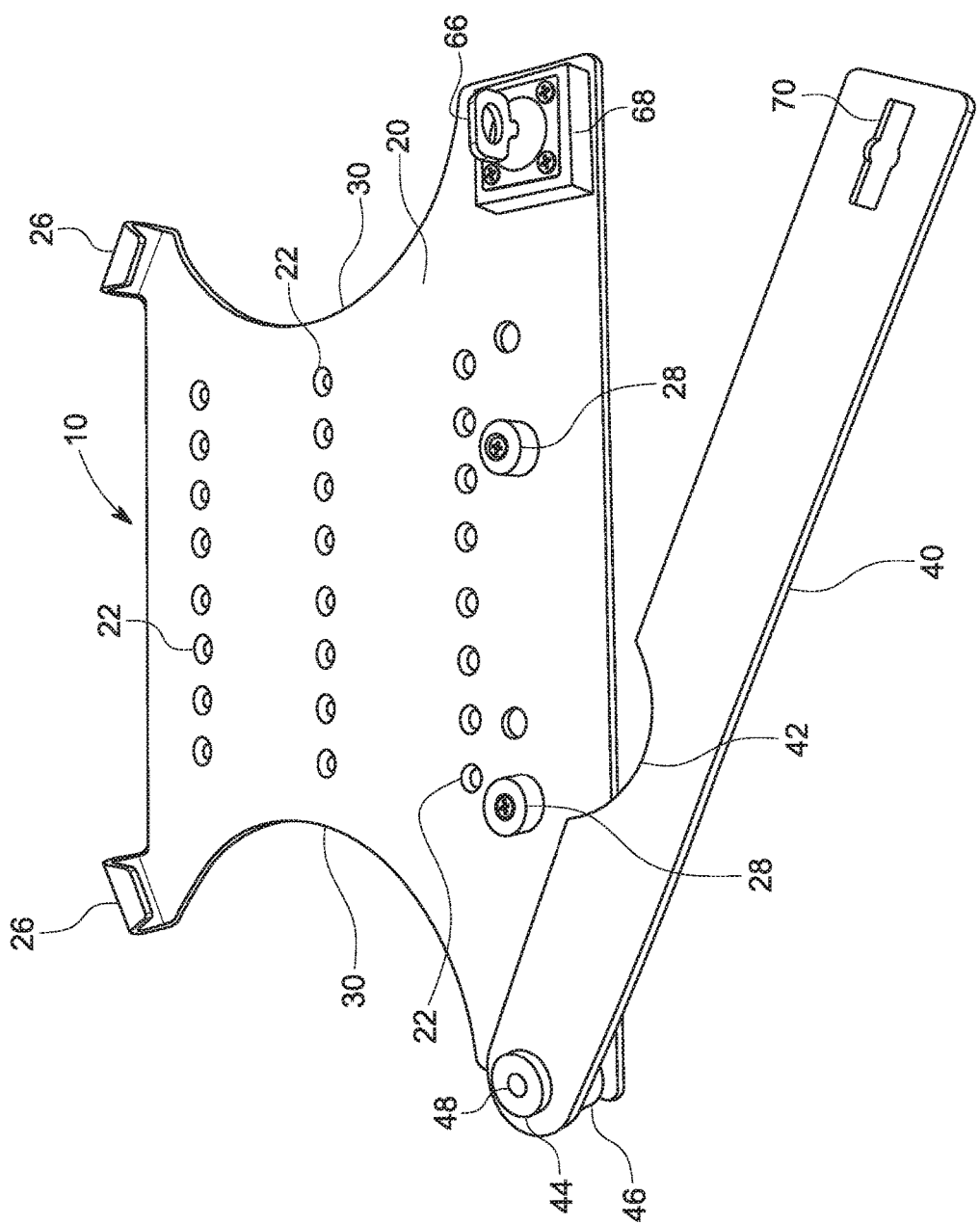
FIG. 10 is a top front perspective view of the embodiment of a Device for Holding Blower Equipment in a Truck shown in FIGS. 8-9, having the retaining bar in an open position, as described herein.
Figure 11:
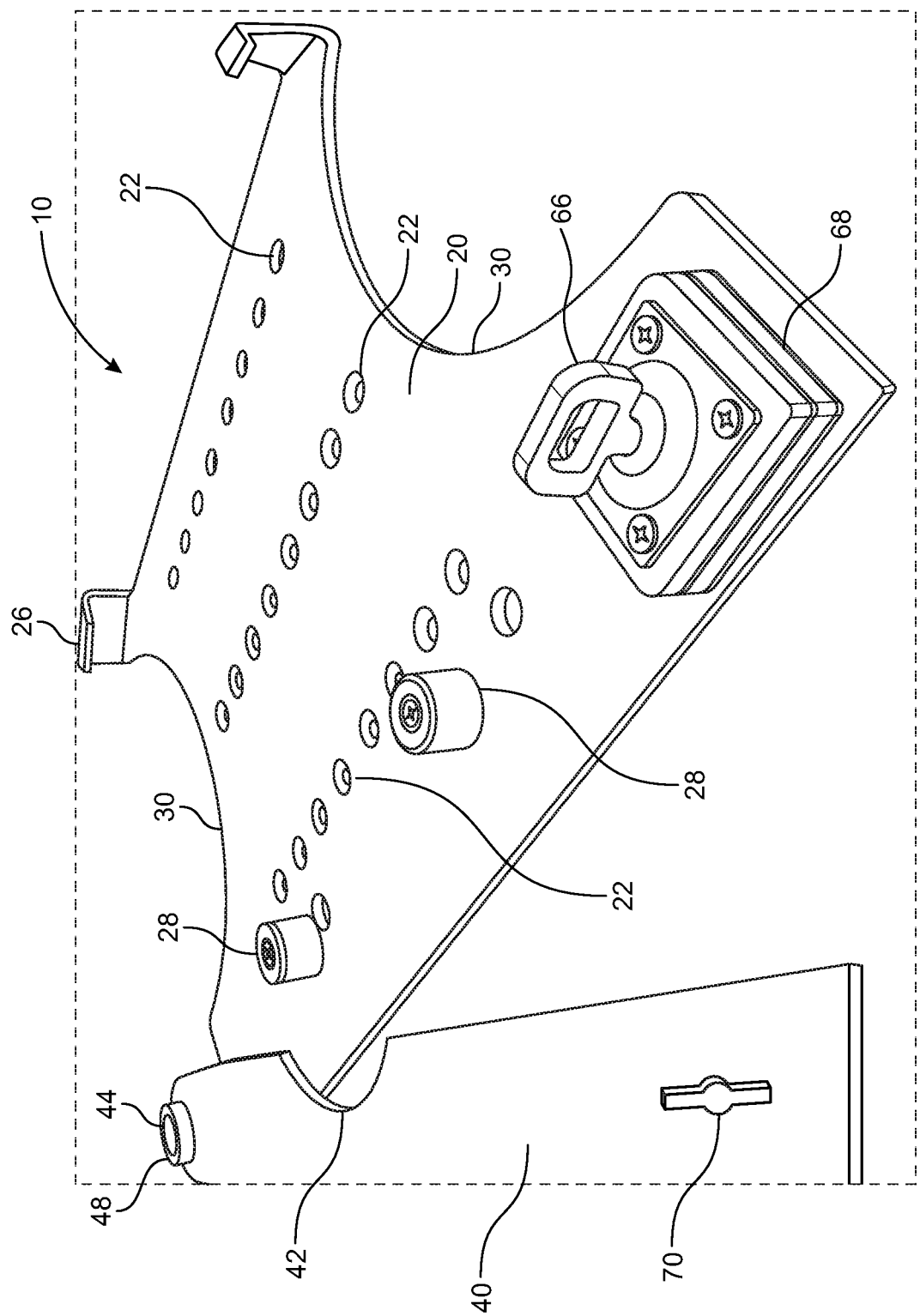
FIG. 11 is a top left front perspective view of the embodiment of a Device for Holding Blower Equipment in a Truck shown in FIGS. 8-10, having the retaining bar in an open position, as described herein.
Figure 12:
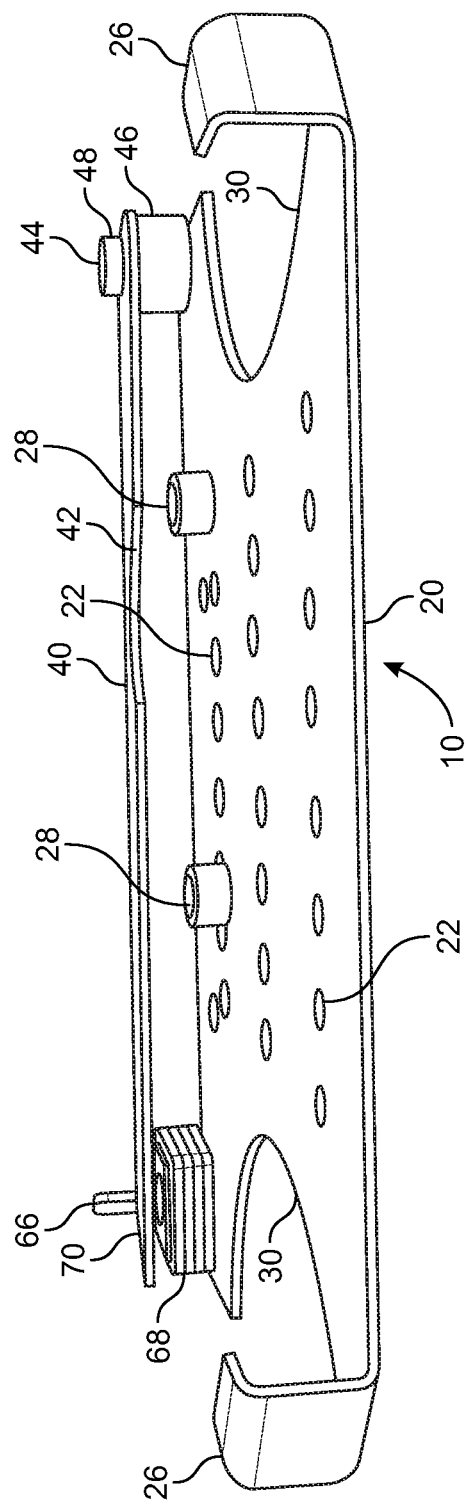
FIG. 12 is a rear view of the embodiment of a Device for Holding Blower Equipment in a Truck shown in FIGS. 8-11, as described herein.

Referring now to FIGS. 1 through 3, an embodiment of the Device for Holding Blower Equipment in Truck 10 is shown. A backpack blower 12 sits on the baseplate 20 of the Device for Holding Blower Equipment in Truck 10. The backpack blower 12 has a backpack blower flange 14 that has a recess or hole 16. The backpack blower 12 is situated in such a way that the recess or hole 16 in the backpack blower flange 14 is engaged with at least one engine-side flange recess or hole engaging device in the form of engine-side flange recess or hole engaging pins 28. As shown in FIG. 3, a retaining device in the form of an engine-side retaining bar 40 is then pivoted over the backpack blower flange 14, so that the backpack blower flange 14 is captured between the engine-side flange recess or hole engaging pins 28 and the engine-side retaining bar 40. The engine-side retaining bar 40 may be provided with a retaining bar relief 42 to allow room for features on the back side of the backpack blower 12. The engine-side retaining bar 40 is further provided with a rotating lock engaging feature 64 that is securely engaged with a locking device such as the rotating lock 60 shown in these figures. In this way, the backpack blower 12 is securely retained to the Device for Holding Blower Equipment in Truck 10.

Turning now to FIGS. 4 through 7, another embodiment of the Device for Holding Blower Equipment in Truck 10 is shown. A baseplate 20 having multiple mounting holes 22 is provided with harness-side flange engaging devices in the form of harness-side flange head posts 24, and engine-side flange recess or hole engaging devices in the form of engine-side flange recess or hole engaging pins 28. The mounting holes 22 may be used to attach the Device for Holding Blower Equipment in Truck 10 to a truck bed or to a trailer. In use, a backpack blower 12 (not shown) having a backpack blower flange 14 (not shown) on its baseplate rests on the baseplate 20 so that the harness-side of the backpack blower flange 14 is beneath the flange heads of the harness-side flange head posts 24, and so that a recess or hole 16 in the backpack blower flange 14 is engaged with the engine-side flange recess or hole engaging pins 28. A retaining device in the form of an engine-side retaining bar 40 then pivots about a retaining bar hinge or pivot 44, thereby capturing the engine-side of the backpack blower flange 14 between the engine-side retaining bar 40 and the engine-side flange recess or hole engaging pins 28, while the harness-side of the backpack blower flange 14 is held in place by the harness-side flange head posts 24.

The engine-side retaining bar 40 is again provided with a rotating lock engaging feature 64 which is engaged with a lock device in the form of a rotating lock 60. The retaining bar hinge or pivot head 48 of the retaining bar hinge or pivot 44 and the rotating lock 60 then cooperate to secure the engine-side retaining bar 40 in place, thereby securely retaining the backpack blower 12 to the Device for Holding Blower Equipment in Truck 10. The engine-side retaining bar 40 may again be provided with a retaining bar relief 42 to allow room for features on the back side of the backpack blower 12. The retaining bar hinge or pivot 44 may be provided with one or more retaining bar hinge or pivot spacer(s) 46, and the rotating lock 60 may be provided with one or more rotating lock spacer(s) 62, by way of which the height of the engine-side retaining bar 40 over the baseplate 20 and engine-side flange recess or hole engaging pins 28 may be varied by adding or subtracting retaining bar hinge or pivot spacer(s) 46 and rotating lock spacer(s) 62 to accommodate backpack blower flanges 14 of varying thicknesses.

Turning now to FIGS. 8 through 12, yet another embodiment of the Device for Holding Blower Equipment in Truck 10 is shown. A baseplate 20 again having multiple mounting holes 22 is provided with harness-side flange engaging devices in the form of harness-side flange engaging ears 26, and engine-side flange recess or hole engaging devices in the form of engine-side flange recess or hole engaging pins 28. The engine-side flange recess or hole engaging pins 28 are attached to the baseplate 20 by way of fasteners and engaging pin mounting holes 32. The baseplate 20 may be provided with baseplate reliefs 30 to provide clearance for structures in the truck bed or trailer, and to minimize weight. The mounting holes 22 may again be used to attach the Device for Holding Blower Equipment in Truck 10 to a truck bed or to a trailer.

In use, a backpack blower 12 (not shown) having a backpack blower flange 14 (not shown) on its baseplate again rests on the baseplate 20 so that the harness-side of the backpack blower flange 14 is beneath the harness-side flange engaging ears 26, and so that the recess or hole 16 in the backpack blower flange 14 is engaged with the engine-side flange recess or hole engaging pins 28. As with previous embodiments, a retaining device in the form of an engine-side retaining bar 40 pivots about a retaining bar hinge or pivot 44, thereby capturing the engine-side of the backpack blower flange 14 between the engine-side retaining bar 40 and the engine-side flange recess or hole engaging pins 28, while the harness-side of the backpack blower flange 14 is held in place by the harness-side flange engaging ears 26.

The engine-side retaining bar 40 is provided with a padlock latch engaging feature 70 which is engaged with a lock device in the form of a padlock latch 66. The retaining bar hinge or pivot head 48 of the retaining bar hinge or pivot 44 and the padlock latch 66 then cooperate to secure the engine-side retaining bar 40 in place, thereby securely retaining the backpack blower 12 to the Device for Holding Blower Equipment in Truck 10. The engine-side retaining bar 40 may again be provided with a retaining bar relief 42 to allow room for features on the back side of the backpack blower 12. The retaining bar hinge or pivot 44 may again be provided with one or more retaining bar hinge or pivot spacer(s) 46, and the padlock latch 66 may be provided with one or more padlock latch spacer(s) 68, by way of which the height of the engine-side retaining bar 40 over the baseplate 20 and engine-side flange recess or hole engaging pins 28 may be varied by adding or subtracting retaining bar hinge or pivot spacer(s) 46 and rotating lock spacer(s) 62 to accommodate backpack blower flanges 14 of varying thicknesses. The retaining bar hinge or pivot 44 and its one or more retaining bar hinge or pivot spacer(s) 46 are attached to the baseplate 20 by way of fasteners and hinge or pivot mounting holes 50. Similarly, the padlock latch 66 and its one or more padlock latch spacer(s) 68 are attached to the baseplate 20 by way of fasteners and lock mounting holes 72.

Figure 13:
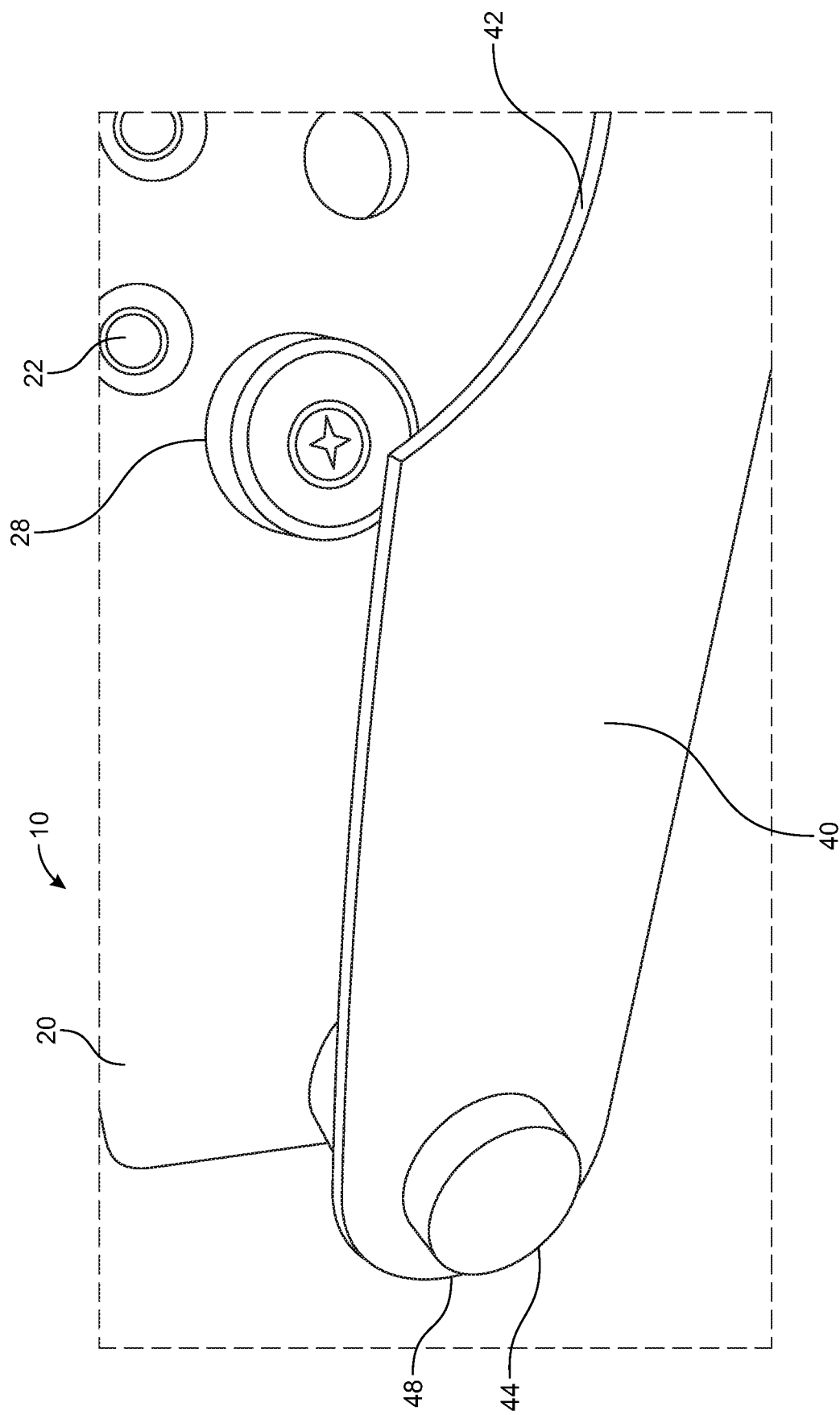
FIG. 13 is a partial detail view of the embodiment of a Device for Holding Blower Equipment in a Truck shown in FIGS. 8-12, showing detail of the retaining bar hinge or pivot and recess or hole engaging pins, as described herein.
Figure 14:
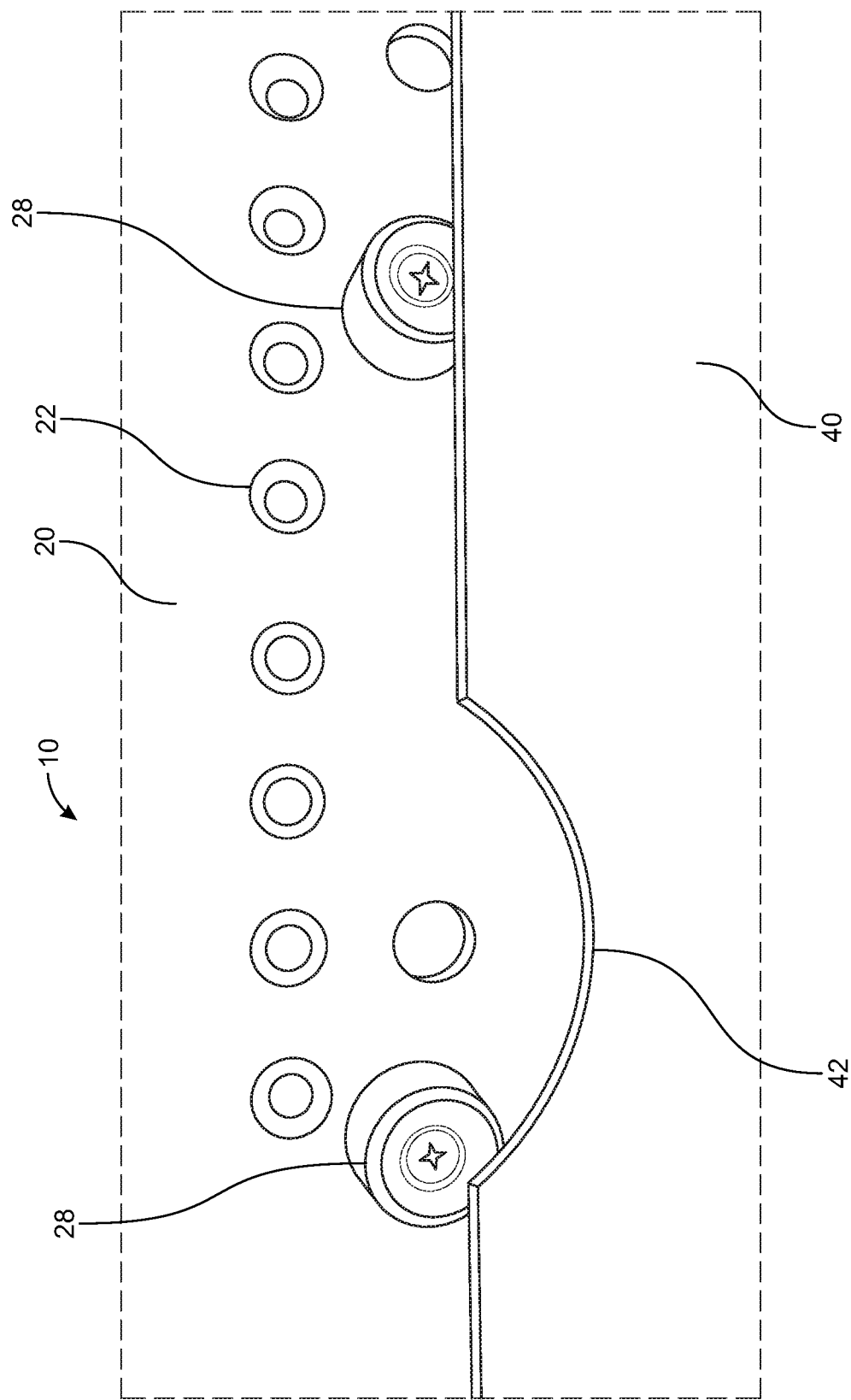
FIG. 14 is a partial detail view of the embodiment of a Device for Holding Blower Equipment in a Truck shown in FIGS. 8-13, showing detail of the retaining bar and recess or hole engaging pins, as described herein.
Figure 15:
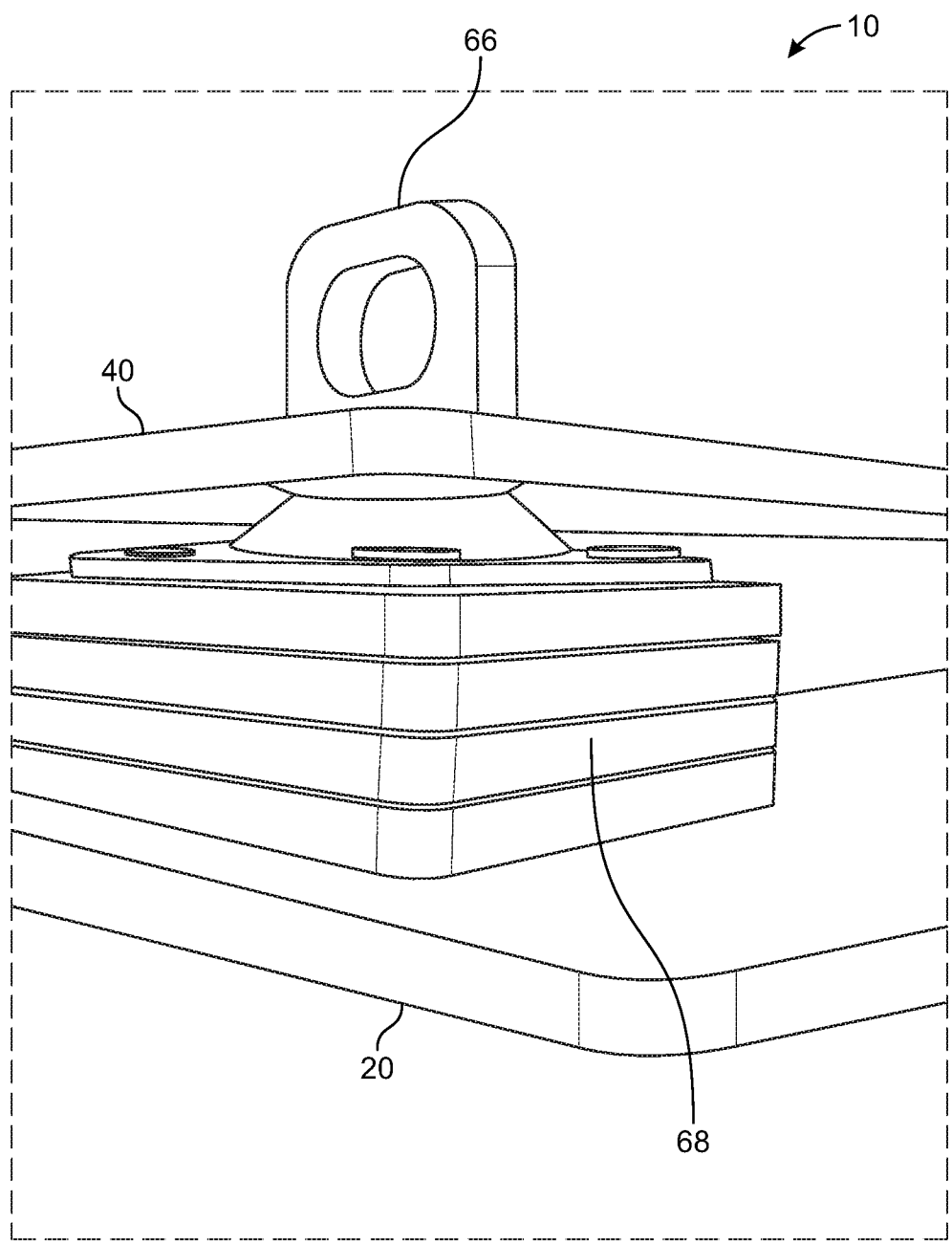
FIG. 15 is a partial detail view of the embodiment of a Device for Holding Blower Equipment in a Truck shown in FIGS. 8-14, showing detail of the rotating lock and rotating lock spacers, as described herein.

FIGS. 13 through 15 show detail views of the engine-side retaining bar 40, retaining bar hinge or pivot 44, and padlock latch 66 of the Device for Holding Blower Equipment in Truck 10. In FIGS. 13 and 14, the baseplate 20 is provided with mounting holes 22 that may again be used to attach the Device for Holding Blower Equipment in Truck 10 to a truck bed or to a trailer. A retaining device in the form of an engine-side retaining bar 40 and engine-side flange recess or hole engaging devices in the form of engine-side flange recess or hole engaging pins 28 again cooperate to securely retain the engine-side of a backpack blower flange 14 (not shown). The engine-side retaining bar 40 may again be provided with a retaining bar relief 42 to allow room for features on the back side of the backpack blower 12 (not shown). The engine-side retaining bar 40 pivots about a retaining bar hinge or pivot 44, which is provided with one or more retaining bar hinge or pivot spacer(s) 46 to accommodate backpack blower flanges 14 of varying thicknesses. A retaining bar hinge or pivot head 48 prevents removal of the engine-side retaining bar 40 from the retaining bar hinge or pivot 44. In FIG. 15, the padlock latch 66 is shown spaced from the baseplate 20 by way of one or more padlock latch spacer(s) 68, similarly to accommodate backpack blower flanges 14 of varying thicknesses.

While the Device for Holding Blower Equipment in a Truck has been described with respect to at least one embodiment, the Device for Holding Blower Equipment in a Truck can be further modified within the spirit and scope of this disclosure, as demonstrated previously. This application is therefore intended to cover any variations, uses, or adaptations of the Device for Holding Blower Equipment in a Truck using its general principles. Further, this application is intended to cover such departures from the present disclosure as come within known or customary practice in the art to which the disclosure pertains and which fall within the limits of the appended claims.

REFERENCE NUMBER LISTING

10 Device for Holding Blower Equipment in Truck
12 Backpack blower
14 Backpack blower flange
16 Recess or hole in backpack blower flange
20 Baseplate
22 Mounting holes
24 Harness-side flange head posts (harness-side flange engaging device)
26 Harness-side flange engaging ears (harness-side flange engaging device)
28 Engine-side flange recess or hole engaging pins (engine-side flange recess or hole engaging device)
30 Baseplate relief
32 Engaging pin mounting holes
40 Engine-side retaining bar (retaining device
42 Retaining bar relief
44 Retaining bar hinge or pivot
46 Retaining bar hinge or pivot spacer(s)
48 Retaining bar hinge or pivot head
50 Hinge or pivot mounting holes
60 Rotating lock (lock device)
62 Rotating lock spacer(s)
64 Rotating lock engaging feature
66 Padlock latch (lock device)
68 Padlock latch spacer(s)
70 Padlock latch engaging feature
72 Lock mounting holes

What is claimed is:

1. A Device for Holding Blower Equipment in a Vehicle, comprising:
    a baseplate having at least one mounting feature;
    at least one blower harness-side flange engaging device attached to the baseplate;
    at least one engine-side flange recess or hole engaging device attached to the baseplate; and
    an engine-side retaining device connected to the baseplate.

2. The Device for Holding Blower Equipment in a Vehicle of claim 1, wherein:
    the at least one blower harness-side flange engaging device further comprises at least two harness-side flange head posts.

3. The Device for Holding Blower Equipment in a Vehicle of claim 1, wherein:
    the at least one blower harness-side flange engaging device further comprises at least two harness-side flange engaging ears.

4. The Device for Holding Blower Equipment in a Vehicle of claim 1, wherein:
    the at least one engine-side flange recess or hole engaging device further comprises at least one engine-side flange recess or hole engaging pin.

5. The Device for Holding Blower Equipment in a Vehicle of claim 1, wherein:
    the engine-side retaining device further comprises an engine-side retaining bar pivotally connected to the baseplate by way of a retaining bar hinge or pivot.

6. The Device for Holding Blower Equipment in a Vehicle of claim 5, wherein:
    the retaining bar hinge or pivot being provided with a retaining bar hinge or pivot head.

7. The Device for Holding Blower Equipment in a Vehicle of claim 5, further comprising:
a lock device attached to the baseplate, wherein the engine-side retaining bar is provided with a lock engaging feature engageable with the lock device.

8. The Device for Holding Blower Equipment in a Vehicle of claim 7, wherein:
the lock device being attached to the baseplate by way of at least one lock spacer; and
the retaining bar hinge or pivot being attached to the baseplate by way of at least one hinge or pivot spacer.

9. The Device for Holding Blower Equipment in a Vehicle of claim 8, wherein:
the lock device being a rotating lock; and
the lock engaging feature of the engine-side retaining bar being a rotating lock engaging feature.

10. The Device for Holding Blower Equipment in a Vehicle of claim 8, wherein:
the lock device being a padlock latch; and
the lock engaging feature of the engine-side retaining bar being a padlock latch engaging feature.

11. The Device for Holding Blower Equipment in a Vehicle of claim 1, further comprising:
a structure arranged to at least one of slide and pivot connected to the base plate.

12. A Device for Holding Blower Equipment in a Vehicle, comprising:
a 12 inch by 12 inch baseplate having multiple mounting holes and configured to be mounted in a vehicle;
two blower harness-side flange head posts or harness-side flange engaging ears attached to the baseplate and configured to engage a flange on the harness-side of a bottom plate of a blower;
two engine-side flange recess or hole engaging pins attached to the baseplate and configured to engage with at least one recess or hole in the flange of the bottom plate of the blower;
a retaining bar pivotally attached at one end to the baseplate by way of a hinge or pivot, and having a lock engaging feature at the other end, the retaining bar being configured to engage the flange on the engine-side of the bottom plate of the blower and to capture the flange between the retaining bar and the two engine-side flange recess or hole engaging pins and/or capture the flange between the retaining bar and the two blower harness-side flange head posts or harness-side flange engaging ears; and
a lock device attached to the baseplate opposite the hinge or pivot, the lock engaging feature of the retaining bar and the lock device being configured to secure the retaining bar in place over the flange on the engine-side of the bottom plate of the blower.

13. The Device for Holding Blower Equipment in a Vehicle of claim 12, wherein:
the hinge or pivot being attached to the baseplate by way of at least one spacer; and
the lock device being attached to the baseplate by way of at least one spacer; wherein
the at least one spacer of the hinge or pivot and the at least one spacer of the lock device cooperating to adjust the height of the retaining bar over the baseplate in order to allow for varying thicknesses of the flange of the bottom plate of the blower.

14. The Device for Holding Blower Equipment in a Vehicle of claim 12, wherein:
the lock device being a rotating lock.

15. The Device for Holding Blower Equipment in a Vehicle of claim 12, wherein:
the lock device being a padlock latch.

16. A method of holding blower equipment, comprising the steps of:
mounting a baseplate in a vehicle using at least one mounting feature;
attaching at least one blower harness-side flange engaging device to the baseplate and configuring the at least one blower harness-side flange engaging device to engage a flange on the harness-side of a bottom plate of a blower;
attaching at least one engine-side flange recess or hole engaging device to the baseplate and configuring the at least one engine-side flange recess or hole engaging device to engage with at least one recess or hole in the flange of the bottom plate of the blower;
pivotally attaching an engine-side retaining device at one end to the baseplate and providing a lock engaging feature at the other end of the engine-side retaining device;
configuring the engine-side retaining device to engage the flange on the engine-side of the bottom plate of the blower and to capture the flange between the retaining bar and the two engine-side flange recess or hole engaging pins and/or capture the flange between the retaining bar and the two blower harness-side flange head posts or harness-side flange engaging ears; and
attaching a lock device to the baseplate opposite the hinge or pivot, and configuring the lock device to secure the retaining bar by way of its lock engaging feature in place over the flange on the engine-side of the bottom plate of the blower.

17. The method of claim 16, further comprising the steps of:
pivotally attaching the engine-side retaining device to the baseplate by way of a hinge or pivot and at least one spacer; and
attaching the lock device to the baseplate by way of at least one spacer;
using the at least one spacer of the hinge or pivot and the at least one spacer of the lock device to adjust the height of the retaining bar over the baseplate in order to allow for varying thicknesses of the flange of the bottom plate of the blower.

18. The method of claim 16 wherein:
the lock device being a rotating lock.

19. The method of claim 16, wherein:
the lock device being a padlock latch.

* * * * *